(12) United States Patent
Washizu

(10) Patent No.: US 8,300,329 B2
(45) Date of Patent: Oct. 30, 2012

(54) OPTICAL ELEMENT ASSEMBLY AND METHOD OF MANUFACTURING OPTICAL UNIT

(75) Inventor: Takashi Washizu, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 136 days.

(21) Appl. No.: 12/934,921

(22) PCT Filed: Mar. 23, 2009

(86) PCT No.: PCT/JP2009/055604
§ 371 (c)(1),
(2), (4) Date: Sep. 27, 2010

(87) PCT Pub. No.: WO2009/122934
PCT Pub. Date: Oct. 8, 2009

(65) Prior Publication Data
US 2011/0026142 A1   Feb. 3, 2011

(30) Foreign Application Priority Data

Mar. 31, 2008 (JP) ................................ 2008-090988

(51) Int. Cl.
*G02B 7/02* (2006.01)
(52) U.S. Cl. ...................................... 359/811; 174/259
(58) Field of Classification Search .................. 359/811, 359/694
See application file for complete search history.

(56) References Cited

U.S. PATENT DOCUMENTS
2006/0226452 A1 * 10/2006 Yamaguchi ................... 257/231

FOREIGN PATENT DOCUMENTS

| JP | 2001-024320 | 1/2001 |
|----|---|---|
| JP | 2005-8527 | 1/2005 |
| JP | 2006-315960 | 11/2006 |
| JP | 2007-327040 | 12/2007 |
| WO | WO 2006/109638 | 10/2006 |
| WO | WO 2007/125829 | 11/2007 |

* cited by examiner

*Primary Examiner* — James Jones
(74) *Attorney, Agent, or Firm* — Cozen O'Connor

(57) ABSTRACT

Disclosed are an optical element assembly comprising a base member in which occurrence of cracks in the base member upon cutting can be prevented and a method of manufacturing an optical unit. The optical element assembly comprises a base member and a plurality of lens members, wherein at least the base member of the optical element assembly is composed of an acryl resin having an alicyclic structure which is a polymer of a monomer represented by the following formula (1) in which linkage groups $R_2$ and $R_3$ lie between an atomic group A and $R_1$OCO and between an atomic group A and OCOCR$_2$, respectively.

$$H_2C\!=\!CR_1COO\!-\!(R_2)_m\text{-}A\text{-}(R_3)_n\!-\!OCOCR_4\!=\!CH_2 \quad (1)$$

3 Claims, 2 Drawing Sheets

OPTICAL ELEMENT ASSEMBLY AND METHOD OF MANUFACTURING OPTICAL UNIT

RELATED APPLICATIONS

This application is a U.S. National Phase Application under 35 USC 371 of International Application PCT/JP2009/055604 filed Mar. 23, 2009.

This application claims the priority of Japanese application 2008-090988 filed Mar. 31, 2008, the entire content of which is hereby incorporated by reference.

FIELD OF THE INVENTION

This invention relates to an optical element assembly and a method of manufacturing an optical unit.

TECHNICAL BACKGROUND

A technology has been proposed in which when IC (Integrated Circuits) chips and other electronic parts are mounted on a circuit board, a conductive material such as a solder and the like is previously subjected to coating (potting) on predetermined positions of the circuit board, electronic parts are provided at the positions and then the resulting circuit board is subjected to reflow treatment (heating treatment) to melt the conductive material to mount the electronic parts on the circuit board. (Refer to Patent Document 1, for example.) According to the technique, it is possible to manufacture electronic modules at low cost.

In recent years, a technique has been proposed in which on a circuit board on which an optical element has been provided in addition to electronic parts has been subjected to reflow treatment as described above, whereby the electronic parts and the optical element are simultaneously mounted on the circuit board, resulting in an electronic module united with the optical element. Thus, further improvement in production efficiency of an optical device production system has been sought. When an optical device is produced by the production system to which the reflow treatment as described above is introduced, it is desired that an inexpensive plastic material be used as a material constituting the optical device in place of an expensive glass material.

It is considered that a thermoplastic resin is used as the plastic material which is easy to process and mold, and has good light transmittance, however, an optical element molded from the thermoplastic resin has a defect that it is likely to deform by heat, since the thermoplastic resin is softened and melted at a relatively low temperature. When an optical element and electronic parts are simultaneously mounted on a circuit board according to the reflow treatment, the optical element composed of the thermoplastic resin is likely to deform and is difficult to show the original optical properties, since the optical element itself is subjected to heating treatment at around 260° C.

In view of the above, the present inventors have studied a heat curable resin as a plastic material used in an optical element which is durable to the reflow treatment. A heat curable resin before curing is in the form of liquid or shows fluidity, and has good processability and moldability like a thermoplastic resin, and a heat curable resin after curing loses fluidity unlike a thermoplastic resin, minimizing deformation due to heat. Among heat curable resins, particularly an acryl resin having an alicyclic structure has excellent heat resistance and therefore, is considered to be a preferred material for an optical element.

Patent Document 1: Japanese Patent O.P.I. Publication No. 2001-24320
Patent Document 2: Japanese Patent O.P.I. Publication No. 2006-315960

DISCLOSURE OF THE INVENTION

Problems to be Solved by the Invention

In recent years, an attempt has been made in which a so-called optical element assembly in which a plurality of lens members are formed on a base member in the form of a wafer is prepared, and is cut into an individual lens member, in which each individual lens member is one optical unit, whereby plural optical units are simultaneously mass-produced, and subjected to the reflow treatment. In this case, when the optical element assembly is cut, it is a base member, which supports the lens member that is subjected to impact force on cutting. When the base member is composed of the acryl resin as described above having an alicyclic structure, the base member is likely to produce cracks due to impact force on cutting, since such an acryl resin is hard and fragile.

In view of the above, a main object of the invention is to provide an optical element assembly which can prevent occurrence of cracks in the base member on cutting and to provide a method of manufacturing an optical unit.

Means for Solving the Above Problems

As one embodiment of the present invention, the invention is to provide an optical element assembly comprising a base member and a plurality of lens members, wherein at least the base member of the optical element assembly is composed of an acryl resin having an alicyclic structure which is a polymer of a monomer represented by the following formula (1) in which linkage groups $R_2$ and $R_3$ lie between an atomic group A and $R_1OCO$ and between an atomic group A and $OCOCR_2$, respectively.

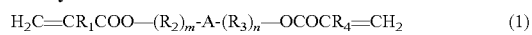
$$H_2C=CR_1COO-(R_2)_m\text{-}A\text{-}(R_3)_n-OCOCR_4=CH_2 \quad (1)$$

In formula (1) above, $R_1$ and $R_4$ independently represent a hydrogen atom, a halogen atom, a hydroxyl group or an alkyl group having a carbon atom number of from 1 to 10, and may be the same or different.

In formula (1) above, "A" is a group represented by the following formula (2) or (3).

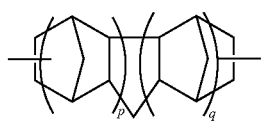

(2)

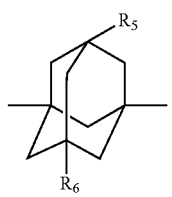

(3)

In formula (2) above, p is an integer of 1 or 2, and q is an integer of 0 or 1.

In formula (3) above, $R_5$ and $R_6$ independently represent a hydrogen atom, a halogen atom, a hydroxyl group or an alkyl group having a carbon atom number of from 1 to 10, and may be the same or different.

It is preferred that the linkage groups $R_2$ and $R_3$ each are an alkylene group having a carbon atom number of not more than 10, a cycloalkylene group having a carbon atom number of from 3 to 20 or a phenylene group.

As another embodiment of the present invention, the invention is to provide a method of manufacturing an optical unit comprising the steps of disposing the optical element assembly as described above between an aperture array having an opening section at a position corresponding to each of the lens members and a spacer array having an opening section at a position corresponding to each of the lens members, joining these materials with each other, and cutting into pieces the optical element assembly together with the aperture array and the spacer array to obtain an individual lens member.

Effects of the Invention

According to the present invention, occurrence of cracks in the base member upon cutting of the optical element assembly can be prevented since the linkage groups $R_2$ and $R_3$ in the acryl resin constituting the base member provides flexibility to the base member itself.

EXPLANATION OF THE SYMBOLS

Figure 1:
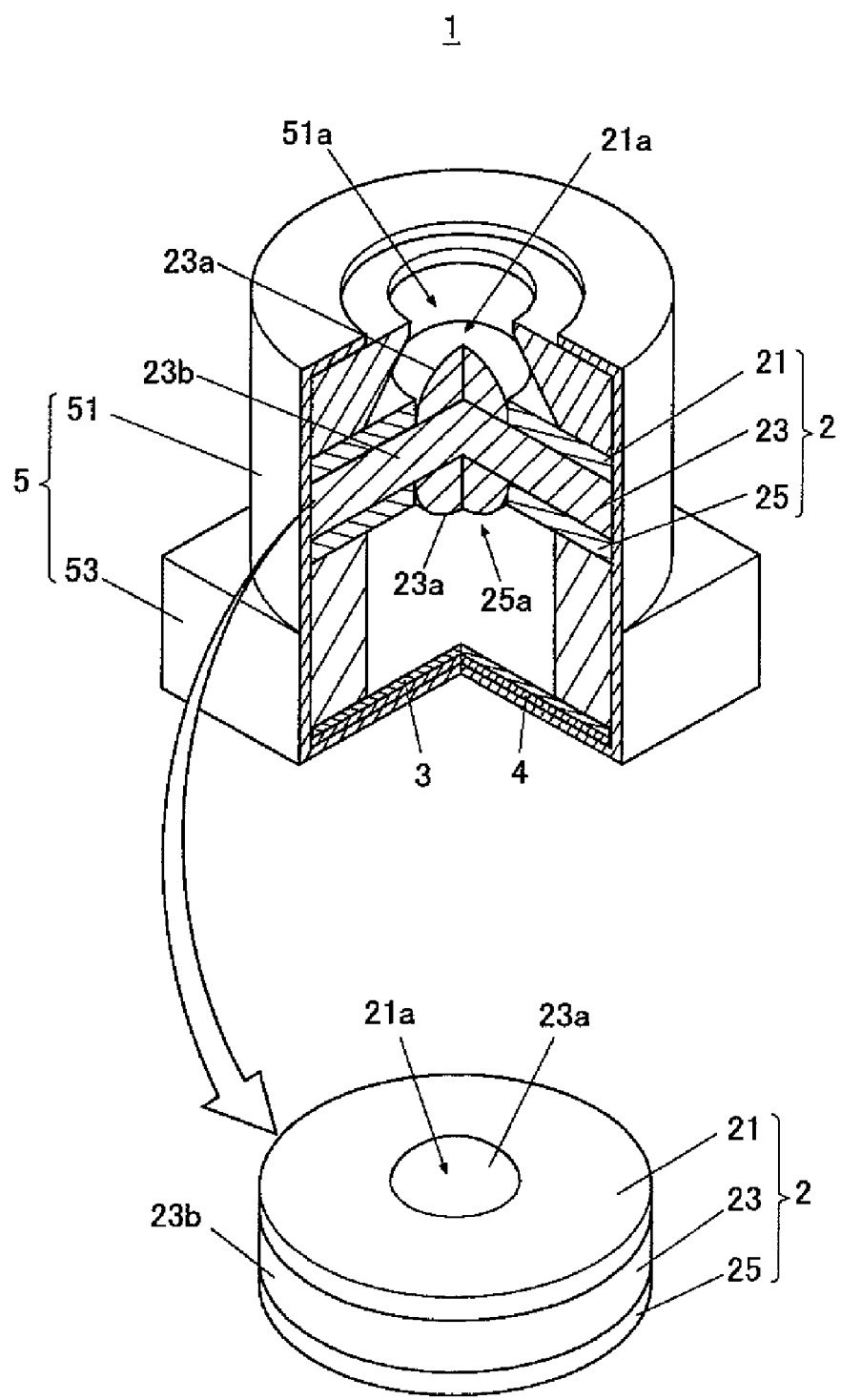
FIG. 1 is an exploded perspective view showing a schematic constitution of an imaging unit according to the preferred embodiment of the present invention.

1 Imaging unit
2 Lens unit
21 Aperture
21a Opening section
23 Lens body
23a Lens member
23b Base member
25 Spacer
25a Opening section
26 Aperture array
27 Lens array
27B Base member
28 Spacer array
3 JR cutting filter
4 Sensor device
5 Casing
51 Cylindrical member
51a Light transmission hole
53 Prismatic member Preferred Embodiment Of The Invention Next, the preferred embodiment of the present invention will be explained with reference to drawings.

As shown in FIG. 1, an imaging unit 1 according to the preferred embodiment of the present invention is mainly composed of a lens unit 2, an IR cutting filter 3, a sensor device 4, and a casing 5, having such a constitution that the lens unit 2, the IR cutting filter 3, and the sensor device 4 are covered with the casing 5.

The casing 5 is constituted of a cylindrical member 51 in the form of a cylinder and a prismatic member 53 in the form of a rectangular parallelepiped. The cylindrical member 51 and the prismatic member 53 are integrally molded, and the cylindrical member 51 is arranged on the prismatic member 53. The lens unit 2 is arranged in the interior of the cylindrical member 51. A light transmission hole 51a in the form of a circle is formed in the top portion of the cylindrical member 51. An IR cutting filter 3 and a sensor device 4 are arranged in the interior (bottom portion) of the prismatic member 53.

The lens unit 2 is one example of the optical unit. As shown in the enlarged view of FIG. 1, the lens unit 2 is mainly constituted of the aperture 21, the lens body 23, and the spacer 25. These members each are stacked in such a manner that the lens body 23 is arranged between the aperture 21 and the spacer 25. The lens body 23 is composed of a lens member 23a in the form of a convexity and a base member 23b in the form of a circular planar plate. The lens member 23 is formed on the front and the rear surface of the base member 23b. The aperture 21 is a member to adjust the amount of light entering the lens body 23, and an opening section 21a in the form of a circle is formed at a position of the aperture corresponding to the lens section 23a. The spacer 25 is a member to adjust the disposition (height position) of the lens unit 51 inside the cylindrical member 51 of the casing 5, and an opening section 25a in the form of a circle is also formed at a position of the spacer corresponding to the lens section 23a (refer to the upper part of FIG. 1).

The imaging unit 1 as described above has such a constitution that external light enters the lens unit 1 through the light transmission hole 51a; and the incident light is subjected to adjustment of light amount by the opening section 21a of the aperture 21, transmitted through the lens member 23a (on the front side) of the lens body 23, the base member 23b and the lens member 23a (on the rear side) of the lens body 23, and then output from the opening section 25a of the spacer 25 toward an IR cutting filter 3. Thereafter, the output light is subjected to IR cutting by the IR cutting filter 3, and finally enters the sensor device 4.

The base member 23b of the lens body 23 is composed of a heat curable or photocurable acryl resin. This acryl resin has an alicyclic structure, and specifically, is a polymer of a monomer having a chemical structure represented by the following formula (1). Particularly, in formula (1), the linkage groups $R_2$ and $R_3$ lie between the atomic group "A" and "$R_1OCO$" and between the atomic group "A" and "$OCOC R_4$", respectively.

$$H_2C=CR_1COO-(R_2)_m-A-(R_3)_n-OCOCR_4=CH_2 \qquad (1)$$

In formula (1) above, $R_1$ and $R_4$ independently represent a hydrogen atom, a halogen atom, a hydroxyl group or an alkyl group having a carbon atom number of from 1 to 10, and may be the same or different. $R_2$ and $R_3$ independently represent an alkylene group having a carbon atom number of from 1 to 10, a cycloalkylene group having a carbon atom number of from 3 to 20 or a phenylene group, and may be the same or different.

In formula (1) above, "A" is a group represented by the following formula (2) or (3).

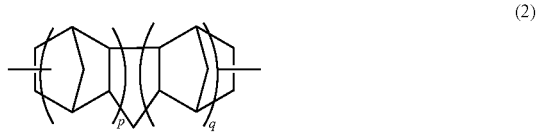

(2)

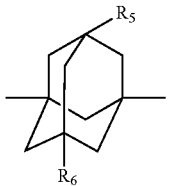
(3)

In formula (2) above, p is an integer of 1 or 2, and q is an integer of 0 or 1.

In formula (3) above, $R_5$ and $R_6$ independently represent a hydrogen atom, a halogen atom, a hydroxyl group or an alkyl group having a carbon atom number of from 1 to 10, and may be the same or different.

Examples of the acryl resin used in the invention include, for example, an acryl resin having a tricyclodecane derivative (Japanese Patent O.P.I. Publication Nos. 7-26193 and 7-69985); and a polymer of a (meth)acrylate monomer such as NK ESTER DCP (tricyclodecane dimethanol dimethacrylate) produced by Shin Nakamura Kagaku Co., Ltd., NK ESTER A-DCP produced by Shin Nakamura Kagaku Co., Ltd., or adamantyl (meth)acrylate (Japanese Patent O.P.I. Publication No. 2005-8527).

These acryl resins may be a homopolymer obtained by polymerization of these (meth)acrylates alone, in which a polymerization initiator described later is used in an amount of from 0.01 to 5 parts by mass based on the total amount, 100 parts by mass of the monomer.

Further, in order to increase a cross-linking degree of the resin, a cross-linking monomer as described later may be mixed with the (meth)acrylate as described above. In this case, it is desirable that the cross-linking monomer in an amount of from 5 to 60% by mass based on the (meth)acrylate in an amount of from 40 to 95% by mass is mixed with a polymerization initiator.

[Polymerization Initiator]

The polymerization initiation can be carried out employing radical polymerization initiators such as various peroxides or azo compounds. As the radical polymerization initiators, known ones can be used without any particular limitations. Typical examples the radical polymerization initiators include ketone peroxides, dialkyl peroxides, peroxyketals, peroxydicarbonates, hydroperoxides, peroxyesters, diacylperoxides, and azo compounds such as 2,2'-azobisisobutyronitrile, 2,2'-azobis(4-dimethylvaleronitrile), 2,2'-azobis(2-methylbutyronitrile), and 1,1'-azobis(cyclohexane-1-carbonitrile).

Examples of the photopolymerization initiator include alkylphenone photopolymerization initiators such as α-hydroxyalkylphenones, α-aminoalkylphenones, and α-amino alkylphenones.

A curing accelerator may be contained if appropriate. The curing accelerator is not specifically limited as long as it shows good curability, is colorless, and does not lower transparency of a resin heat cured. Examples of the curing accelerator include imidazoles such as 2-ethyl-4-methylimidazole (2E4MZ), tertiary amines, quaternary ammonium salts, bicyclic amidines such as diazabicycloundecene and the like or their derivatives, phosphines and phosphonium salts. These may be employed singly or as an admixture of two or more kinds thereof.

[Cross-Linking Monomers]

Typical examples of the cross-linking monomers include tetraethylene glycol di(meth)acrylate, 2-methyl-1,8-octane diol (meth)acrylate, 1,3-hexane diol di(meth)acrylate, neopentyl diol di(meth)acrylate, polyethylene glycol di(meth)acrylate, ethylene oxide modified bisphenol A di(meth)acrylate, propylene oxide modified bisphenol A di(meth)acrylate, trimethylolpropane tri(meth)acrylate, and ditrimethylolpropane tetra(meth)acrylate. These cross-linking monomers may be used singly or as an admixture of two or more kinds thereof.

In the lens body 23, a material constituting the lens member 23a and a material constituting the base member 23b may be the same or different. In the case where the lens member 23a is composed of a material different from that of the base member 23b, the lens member 23a is composed of preferably an epoxy resin or an acryl resin, and more preferably a heat curable or photocurable acryl resin having an alicyclic structure. When the lens member 23a is composed of a material different from that of the base member 23b, optical properties such as refractive index can be arbitrarily varied according to kinds of material constituting the lens member 23a.

Next, a method of manufacturing the imaging unit 1 (including a method of manufacturing the lens unit 2) will be explained employing FIG. 2.

Figure 2:
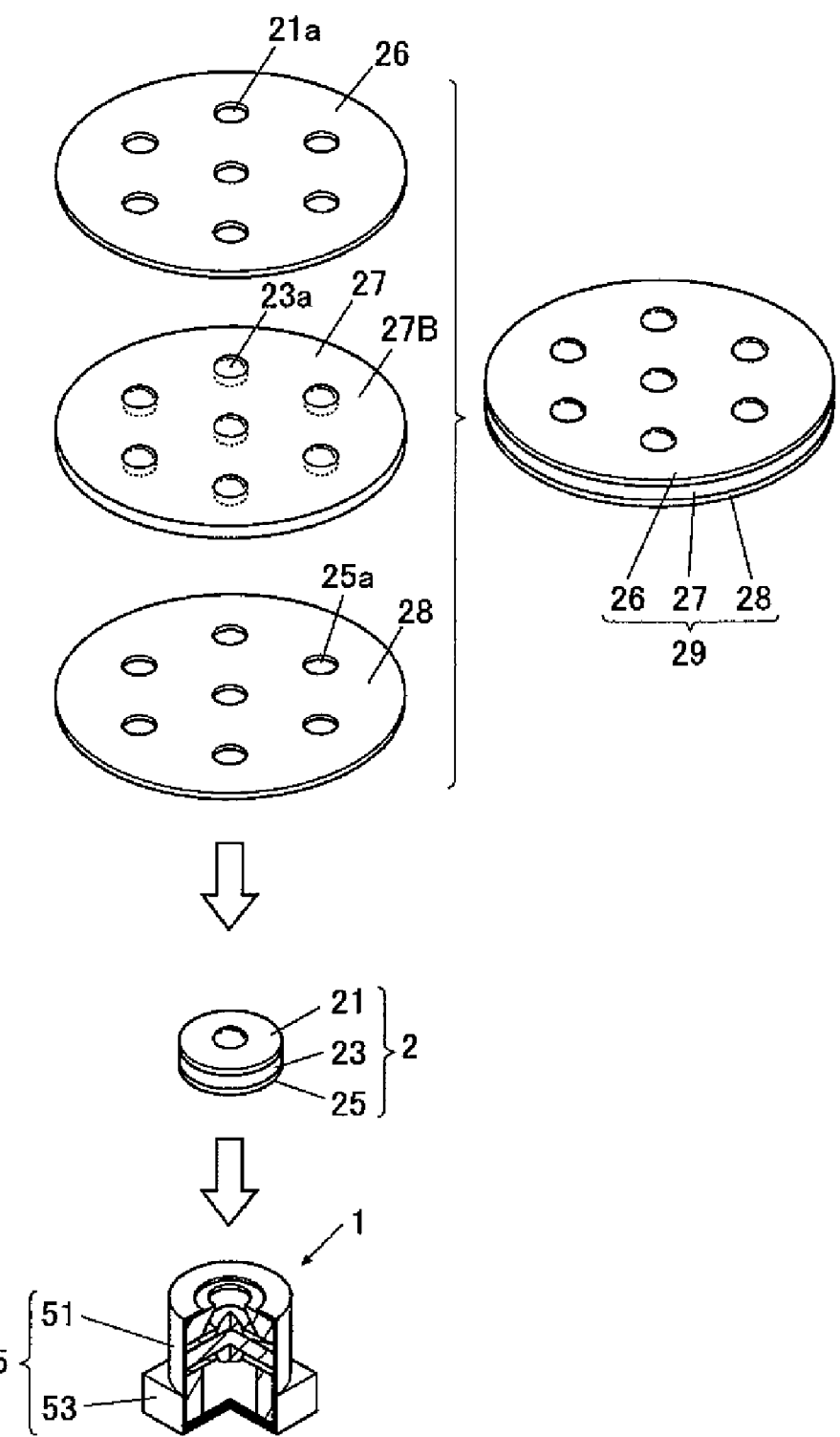
FIG. 2 is a diagram schematically showing a method of manufacturing an imaging unit according to the preferred embodiment of the present invention.

As shown in the upper part of FIG. 2, there are provided a lens array 27 wherein a plurality of lens members 23a are formed, an aperture array 26 and a spacer array 28. The aperture array 26 and the spacer array 28 are ones obtained by molding a heat curable resin according to an injection molding method, the heat curable resin being mixed with a carbon and colored black. In the aperture array 26, opening sections 21a of the same number as the lens members 23a are formed, and each of the opening sections 21a is disposed at a position corresponding to the position of each of the lens members 23a. Also in the spacer array 28, opening sections 25a of the same number as the lens members 23a are formed, and each of the opening sections 25a is disposed at a position corresponding to the position of each of the lens members 23a.

When the lens array 27 is manufactured, the acryl resin described above is injection molded to form a base member 27B with a large diameter and then, a plurality of lens members 23a are formed on the front and rear surfaces of the resulting base member 27B. The lens array 27 thus manufactured is one example of the optical element assembly, in which a plurality of lens members 23a are formed on the front and rear surfaces of the resulting base member 27B. The base member 27B is a precursor of the base member 23b of the lens body 23, and is composed of the resin as described above.

After that the lens array 27 is disposed between the aperture array 26 and the spacer array 28, and these arrays are adhered to each other through an adhesive. Thus, the lens unit array 29 is manufactured.

Thereafter, as shown in the middle part and the bottom part of FIG. 2, the lens unit array 29 is cut into pieces to obtain an individual lens member 23a, thereby manufacturing a plurality of lens units 2. When the lens unit array 29 is cut into pieces to obtain an individual lens member 23a, the base member 27B is cut together with the aperture array 26 and the space array 28 according to an endmill method or a hole saw method. When the endmill method is employed, a cutting machine produced by PMT Co., Ltd. can be used. Thereafter, each of the resulting lens units 2 is built into (allowed to adhere to) the cylindrical member 51 of the casing 5 to manufacture an imaging unit 1.

In the embodiment of the present invention as described above, the base member 27B of the lens array 27, which is composed of the acryl resin described above having a structure as represented by formula (1) having the linkage group $R_2$, $R_3$, is more flexible, as compared with that composed of a resin having no linkage group such as $R_2$ or $R_3$, and therefore, when the lens unit array 29 is cut into pieces to obtain an individual lens member 23a, occurrence of cracks in the base member 27B can be restrained or prevented (refer to the following Examples).

EXAMPLES (1) Preparation of Sample Nos. 1 Through 10
(1.1) Preparation of Sample No. 1

One percent by mass of PERBUTYL O produced by Nippon Yushi Co. Ltd. as a polymerization initiator was mixed with NK ESTER 1G (ethylene glycol dimethacrylate) produced by Shin Nakamura Kagaku Co., Ltd., and the resulting mixture was heat cured at 180° C. for 10 minutes to prepare a disc-like base member with a diameter of 11 mm and a thickness of 1 mm. Thereafter, the same materials as above were processed in the same manner as above to form plural (about ten) lens members with a thickness of 0.8 mm on the front and rear sides of the disc-like base member obtained above. Thus, Sample No. 1 was obtained.

(1.2) Preparation of Sample No. 2

One percent by mass of PERBUTYL O produced by Nippon Yushi Co. Ltd. as a polymerization initiator was mixed with tricyclodecane diol dimethacrylate prepared according to the method disclosed in Japanese Patent O.P.I. Publication No. 2006-315960, and the resulting mixture was heat cured at 180° C. for 10 minutes to prepare a disc-like base member with a diameter of 11 mm and a thickness of 1 mm. Thereafter, the same materials as above were processed in the same manner as above to form plural (about ten) lens members with a thickness of 0.8 min on the front and rear sides of the disc-like base member obtained above. Thus, Sample No. 2 was obtained.

(1.3) Preparation of Sample No. 3

One percent by mass of PERBUTYL O produced by Nippon Yushi Co. Ltd. as a polymerization initiator was mixed with NK ESTER DCP (tricyclodecane dimethanol dimethacrylate) produced by Shin Nakamura Kagaku Co., Ltd., and the resulting mixture was heat cured at 180° C. for 10 minutes to prepare a disc-like base member with a diameter of 11 mm and a thickness of 1 mm. Thereafter, the same materials as above were processed in the same manner as above to form plural (about ten) lens members with a thickness of 0.8 mm on the front and rear sides of the disc-like base member obtained above. Thus, Sample No. 3 was obtained.

(1.4) Preparation of Sample No. 4

One percent by mass of PERBUTYL O produced by Nippon Yushi Co. Ltd. as a polymerization initiator was mixed with NK ESTER DCP (tricyclodecane dimethanol dimethacrylate) produced by Shin Nakamura Kagaku Co., Ltd., and the resulting mixture was heat cured at 180° C. for 10 minutes to prepare a disc-like base member with a diameter of 11 mm and a thickness of 1 mm. Thereafter, one percent by mass of IRUGACURE 184 produced by Ciba Japan Co. Ltd. as a photopolymerization initiator was mixed with NK ESTER DCP (tricyclodecane dimethanol dimethacrylate) produced by Shin Nakamura Kagaku Co., Ltd., and the resulting mixture was subjected to UV irradiation for curing to form plural (about ten) lens members with a thickness of 0.8 mm on the front and rear sides of the disc-like base member obtained above. Thus, Sample No. 4 was obtained.

(1.5) Preparation of Sample No. 5

One percent by mass of PERBUTYL O produced by Nippon Yushi Co. Ltd. as a polymerization initiator was mixed with NK ESTER DCP (tricyclodecane dimethanol dimethacrylate) produced by Shin Nakamura Kagaku Co., Ltd., and the resulting mixture was heat cured at 180° C. for 10 minutes to prepare a disc-like base member with a diameter of 11 mm and a thickness of 1 mm. Thereafter, an aromatic group-containing epoxy resin produced by Daicel Co. Ltd. and acid anhydride EPICLON B-650 produced by Dainippon Ink Kagaku Co., Ltd. as a curing agent were mixed in an equimolecular amount, and the resulting mixture was heat cured at 160° C. for 10 minutes to form plural (about ten) lens members with a thickness of 0.8 mm on the front and rear sides of the disc-like base member obtained above. Thus, Sample No. 5 was obtained.

(1.6) Preparation of Sample No. 6

One percent by mass of IRUGACURE 184 produced by Ciba Japan Co. Ltd. as a photopolymerization initiator was mixed with NK ESTER DCP (tricyclodecane dimethanol dimethacrylate) produced by Shin Nakamura Kagaku Co., Ltd., and the resulting mixture was subjected to UV irradiation for curing to prepare a disc-like base member with a diameter of 11 mm and a thickness of 1 mm. Thereafter, one percent by mass of PERBUTYL O produced by Nippon Yushi Co. Ltd. as a polymerization initiator was mixed with NK ESTER DCP (tricyclodecane dimethanol dimethacrylate) produced by Shin Nakamura Kagaku Co., Ltd., and the resulting mixture was heat cured at 180° C. for 10 minutes to form plural (about ten) lens members with a thickness of 0.8 mm on the front and rear sides of the disc-like base member obtained above. Thus, Sample No. 6 was obtained.

(1.7) Preparation of Sample No. 7

One percent by mass of IRUGACURE 184 produced by Ciba Japan Co. Ltd. as a photopolymerization initiator was mixed with NK ESTER DCP (tricyclodecane dimethanol dimethacrylate) produced by Shin Nakamura Kagaku Co., Ltd., and the resulting mixture was subjected to UV irradiation for curing to prepare a disc-like base member with a diameter of 11 mm and a thickness of 1 mm. Thereafter, the same materials as above were processed in the same manner as above to form plural (about ten) lens members with a thickness of 0.8 mm on the front and rear sides of the disc-like base member obtained above. Thus, Sample No. 7 was obtained.

(1.8) Preparation of Sample No. 8

One percent by mass of IRUGACURE 184 produced by Ciba Japan Co. Ltd. as a photopolymerization initiator was mixed with NK ESTER DCP (tricyclodecane dimethanol dimethacrylate) produced by Shin Nakamura Kagaku Co., Ltd., and the resulting mixture was subjected to UV irradiation for curing to prepare a disc-like base member with a diameter of 11 mm and a thickness of 1 mm. Thereafter, an aromatic group-containing epoxy resin produced by Daicel Co. Ltd. and acid anhydride EPICLON B-650 produced by Dainippon Ink Kagaku Co., Ltd as a curing agent were mixed in an equimolecular amount, and the resulting mixture was heat cured at 160° C. for 10 minutes to form plural (about ten) lens members with a thickness of 0.8 mm on the front and rear sides of the disc-like base member obtained above. Thus, Sample No. 8 was obtained.

(1.9) Preparation of Sample No. 9

A disc-like glass with a diameter of 11 mm and a thickness of 1 mm was employed as a base member. Thereafter, one percent by mass of IRUGACURE 184 produced by Ciba Japan Co. Ltd. as a photopolymerization initiator was mixed with NK ESTER DCP (tricyclodecane dimethanol dimethacrylate) produced by Shin Nakamura Kagaku Co., Ltd., and the resulting mixture was subjected to UV irradiation to form plural (about ten) lens members with a thickness of 0.8 mm on the front and rear sides of the disc-like base member above. Thus, Sample No. 9 was obtained.

(1.10) Preparation of Sample No. 10

One percent by mass of PERBUTYL O produced by Nippon Yushi Co. Ltd. as a polymerization initiator was mixed with 1,3-adamantane diol dimethacrylate (ADDA) produced by Shin Nakamura Kagaku Co., Ltd., and the resulting mixture was heat cured at 180° C. for 10 minutes to prepare a disc-like base member with a diameter of 11 mm and a thickness of 1 mm. Thereafter, the same materials as above were processed in the same manner as above to form plural (about ten) lens members with a thickness of 0.8 mm on the front and rear sides of the disc-like base member obtained above. Thus, Sample No. 10 was obtained.

(1.11) Preparation of Sample No. 11

One percent by mass of PERBUTYL O produced by Nippon Yushi Co. Ltd. as a polymerization initiator was mixed with 1,3-bis(2-methacryloyloxyethoxy)adamantane (adamantyl dimethacrylate) prepared according to Example 1 of Japanese Patent O.P.I. Publication No. 2005-8527, and the resulting mixture was heat cured at 180° C. for 10 minutes to prepare a disc-like base member with a diameter of 11 mm and a thickness of 1 mm. Thereafter, the same materials as above were processed in the same manner as above to form plural (about ten) lens members with a thickness of 0.8 mm on the front and rear sides of the disc-like base member obtained above. Thus, Sample No. 11 was obtained.

(1.12) Preparation of Sample No. 12

One percent by mass of PERBUTYL O produced by Nippon Yushi Co. Ltd. as a polymerization initiator was mixed with 1,3-bis(2-methacryloyloxyethoxy)adamantane (adamantyl dimethacrylate) prepared according to Example 1 of Japanese Patent O.P.I. Publication No. 2005-8527, and the resulting mixture was heat cured at 180° C. for 10 minutes to prepare a disc-like base member with a diameter of 11 mm and a thickness of 1 mm. Thereafter, one percent by mass of IRUGACURE 184 produced by Ciba Japan Co. Ltd. as a photopolymerization initiator was mixed with NK ESTER DCP tricyclodecane dimethanol dimethacrylate produced by Shin Nakamura Kagaku Co., Ltd., and the resulting mixture was subjected to UV irradiation to prepare a disc-like base member with a diameter of 11 mm and a thickness of 1 mm. Thus, Sample No. 12 was obtained.

(1.13) Preparation of Sample No. 13

One percent by mass of PERBUTYL O produced by Nippon Yushi Co. Ltd. as a polymerization initiator was mixed with 1,3-bis(2-metbacroyloxyethoxy)adamantane (adamantyl dimethacrylate) prepared according to Example 1 of Japanese Patent O.P.I. Publication No. 2005-8527, and the resulting mixture was heat cured at 180° C. for 10 minutes to prepare a disc-like base member with a diameter of 11 min and a thickness of 1 mm. Thereafter, an aromatic group-containing epoxy resin produced by Daicel Co. Ltd. and acid anhydride EPICLON B-650 produced by Dainippon Ink Kagaku Co., Ltd as a curing agent were mixed in an equimolecular amount, and the resulting mixture was heat cured at 160° C. for 10 minutes to form plural (about ten) lens members with a thickness of 0.8 mm on the front and rear sides of the disc-like base member obtained above. Thus, Sample No. 13 was obtained.

(2) Test and Evaluation of Sample Nos. 1 Through 13

(2.1) Reflow Heat Resistance Test

Each of Sample Nos. 1 through 13 was subjected to heat treatment at 260° C. for 5 minutes in an oven (which corresponded to reflow treatment). Then, light transmittance of each sample before and after the heat treatment was measured, and lowering of light transmittance after the heat treatment was evaluated. A light with a wavelength of 400 nm was employed for the measurement.

The results are shown in Table 1. In Table 1, criteria "A", "B", "C" and "D" are as follows.

"A": Lowering of light transmittance was less than 1%.
"B": Lowering of light transmittance was in the range of from 1% to less than 3%.
"C": Lowering of light transmittance was in the range of from 3% to less than 5%.
"D": Lowering of light transmittance was 5% or more.

(2.2) Cutting Property

Each of Sample Nos. 1 through 13 was cut into pieces to obtain an individual lens member with the base member, and the resulting product was visually observed for cracks. Herein, a cutting machine produced by PMT Co., Ltd. was employed for cutting. The cutting method was an endmill method.

The results are shown in Table 1. In Table 1, criteria "A" and "B" are as follows.

"A": No cracks were observed.
"B": Cracks were observed, which is practically problematic.

TABLE 1

| Sample No. | Lenz Member Material | $R_2, R_3$ | Base Member Material | $R_2, R_3$ | Reflow Resistance | Cutting Property | Remarks |
|---|---|---|---|---|---|---|---|
| 1 | Acryl | Present | Acryl | Present | D | A | Comp. |
| 2 | Acryl (a) | None | Acryl (a) | None | B | B | Comp. |
| 3 | Acryl (a) | Present | Acryl (a) | Present | A | A | Inv. |
| 4 | Acryl (b) | | | | A | A | Inv. |
| 5 | Epoxy | | | | C | A | Inv. |
| 6 | Acryl (a) | Present | Acryl (b) | Present | A | A | Inv. |
| 7 | Acryl (b) | | | | A | A | Inv. |
| 8 | Epoxy | | | | C | A | Inv. |
| 9 | Acryl (b) | Present | Glass | — | — | B | Comp. |
| 10 | Acryl (a) | None | Acryl (a) | None | B | B | Comp. |
| 11 | Acryl (a) | Present | Acryl (a) | Present | A | A | Inv. |
| 12 | Acryl (b) | | | | A | A | Inv. |
| 13 | Epoxy | | | | C | A | Inv. |

Comp.: Comparative;
Inv.: Inventive
(a): an alicyclic structure;
(b): UV, an alicyclic structure;

(3) SUMMARY

Sample No. 1, which employs a lens member and a base member each comprised of an acryl resin having no alicyclic structure, shows low heat resistance and marked lowering of light transmittance. Sample No. 2, which employs a lens member and a base member each comprised of an acryl resin having an alicyclic structure, shows higher heat resistance and prevents lowering of light transmittance, however, it produces cracks on cutting, since the acryl resin has no linkage groups R2, R3, and therefore, is structurally fragile.

Sample No. 3, which employs a lens member and a base member each comprised of an acryl resin having an alicyclic structure and linkage groups R2, R3, prevents lowering of light transmittance, and produces no cracks on cutting. Sample No. 4, which employs a base member comprised of an acryl resin having an alicyclic structure and a lens member comprised of an acryl resin obtained by photopolymerization of a monomer having an alicyclic structure, provides the same superior results as Sample No. 3.

Sample No. 5, in which the lens member of Sample No. 4 is replaced with that comprised of the epoxy resin, produces coloration of the epoxy resin after reflow treatment, but does not cause separation of the lens member from the base member, showing that it can be put into practical use even though a material of the base member is different from that of the lens member. Sample Nos. 6, 7 and 8 are prepared in the same mariner as Sample Nos. 3, 4 and 5, respectively, except that the resin of the base member is replaced with the UV curable resin, and they show the same curability as the heat curability. Sample No. 9, in which the resin of the base member of Sample No. 4 is replaced with glass, causes separation of the lens member from the base member after reflow treatment. This is due to the difference in coefficient of heat expansion between the resin and the glass, and as is apparent from the above, such a phenomenon can be prevented by the use of the resin material in the base member.

Sample Nos. 10, 11, 12 and 13 are prepared in the same manner as Sample Nos. 2, 3, 4 and 5, respectively, except that the acryl resins having an alicyclic structure used in the base member are replaced with those having an adamantine residue, and they show the same results as Sample Nos. 2, 3, 4 and 5, respectively.

In view of the above, it has proved that use of an acryl resin having the linkage group $R_2$, $R_3$ as a material of the base member is effective in preventing occurrence of cracks on cutting, and use of the resin having an alicyclic structure as materials of both lens member and base member is effective in restraining lowering of light transmittance after reflow treatment.

The invention claimed is:

1. An optical element assembly comprising a base member and a plurality of lens members, wherein at least the base member of the optical element assembly is composed of an acryl resin having an alicyclic structure which is a polymer of a monomer represented by the following formula (1),

wherein $R_1$ and $R_4$ independently represent a hydrogen atom, a halogen atom, a hydroxyl group or an alkyl group having a carbon atom number of from 1 to 10; $R_2$ and $R_3$ represent a linkage group; and "A" is a group represented by the following formula (2) or (3),

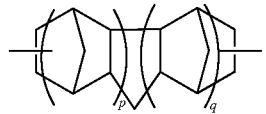

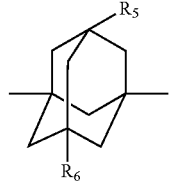

wherein p is an integer of 1 or 2; q is an integer of 0 or 1; and $R_5$ and $R_6$ independently represent a hydrogen atom, a halogen atom, a hydroxyl group or an alkyl group having a carbon atom number of from 1 to 10.

2. The optical element assembly of claim 1, wherein the linkage groups $R_2$ and $R_3$ independently represent an alkylene group having a carbon atom number of less than 10, a cycloalkylene group having a carbon atom number of from 3 to 20 or a phenylene group.

3. A method of manufacturing an optical unit comprising the steps of:
    disposing an optical element assembly comprising a base member and a plurality of lens members between an aperture array having an opening section at a position corresponding to each of the plurality of lens members and a spacer array having an opening section at a position corresponding to each of the plurality of lens members, thereby preparing a lens unit array; and
    cutting the lens unit array,
    wherein at least the base member of the optical element assembly is composed of an acryl resin having an alicyclic structure which is a polymer of a monomer represented by the following formula (1),

wherein $R_1$ and $R_4$ independently represent a hydrogen atom, a halogen atom, a hydroxyl group or an alkyl group having a carbon atom number of from 1 to 10; $R_2$ and $R_3$ represent a linkage group; and "A" is a group represented by the following formula (2) or (3),

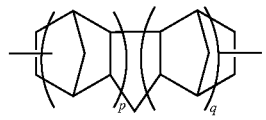

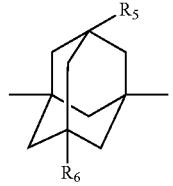

wherein p is an integer of 1 or 2; q is an integer of 0 or 1; and $R_5$ and $R_6$ independently represent a hydrogen atom, a halogen atom, a hydroxyl group or an alkyl group having a carbon atom number of from 1 to 10.

* * * * *